United States Patent
Thomas et al.

(10) Patent No.: US 11,918,136 B2
(45) Date of Patent: *Mar. 5, 2024

(54) JUICER JUG

(71) Applicant: BREVILLE PTY LIMITED, Alexandria (AU)

(72) Inventors: Mark Thomas, Leichhardt (AU); Samuel Adeloju, Randwick (AU); Richard Hoare, Lane Cove (AU); Stephen John McClean, Camden South (AU)

(73) Assignee: BREVILLE PTY LIMITED, Alexandria (AU)

(*) Notice: Subject to any disclaimer, the term of this patent is extended or adjusted under 35 U.S.C. 154(b) by 840 days.

This patent is subject to a terminal disclaimer.

(21) Appl. No.: 16/914,262

(22) Filed: Jun. 26, 2020

(65) Prior Publication Data

US 2020/0323379 A1    Oct. 15, 2020

Related U.S. Application Data

(63) Continuation of application No. 15/313,099, filed as application No. PCT/AU2015/000305 on May 22, 2015, now Pat. No. 10,729,270.

(30) Foreign Application Priority Data

May 22, 2014    (AU) .................................. 2014901921

(51) Int. Cl.
    *A47J 19/02*    (2006.01)
    *A47G 19/12*    (2006.01)
    (Continued)

(52) U.S. Cl.
    CPC ............ *A47J 19/027* (2013.01); *A47G 19/12* (2013.01); *A47J 19/02* (2013.01); *A47J 47/01* (2013.01);
    (Continued)

(58) Field of Classification Search
    CPC ...... A47G 19/12; A47G 19/14; A47G 19/127; A47G 2019/122; A47J 19/027; A23N 1/02
    (Continued)

(56) References Cited

U.S. PATENT DOCUMENTS 3,189,229 A * 6/1965 Carroll ................ A47J 41/0077
                                                    29/455.1
5,443,184 A * 8/1995 Broitzman ............. A47G 19/12
                                                    222/572

(Continued)

FOREIGN PATENT DOCUMENTS

CA    2530865 A1    1/2005
CN    1816298 A     8/2006
(Continued)

OTHER PUBLICATIONS

Office Action issued in Chinese Patent Application No. 2015/800331609, dated Apr. 3, 2018.
(Continued)

*Primary Examiner* — Reginald Alexander
(74) *Attorney, Agent, or Firm* — Patterson + Sheridan, LLP

(57) ABSTRACT

A jug for a juicer has sealing features so that its contents may be isolated from the environment when it is not being filled or when used for pouring.

14 Claims, 12 Drawing Sheets

Figure 1:
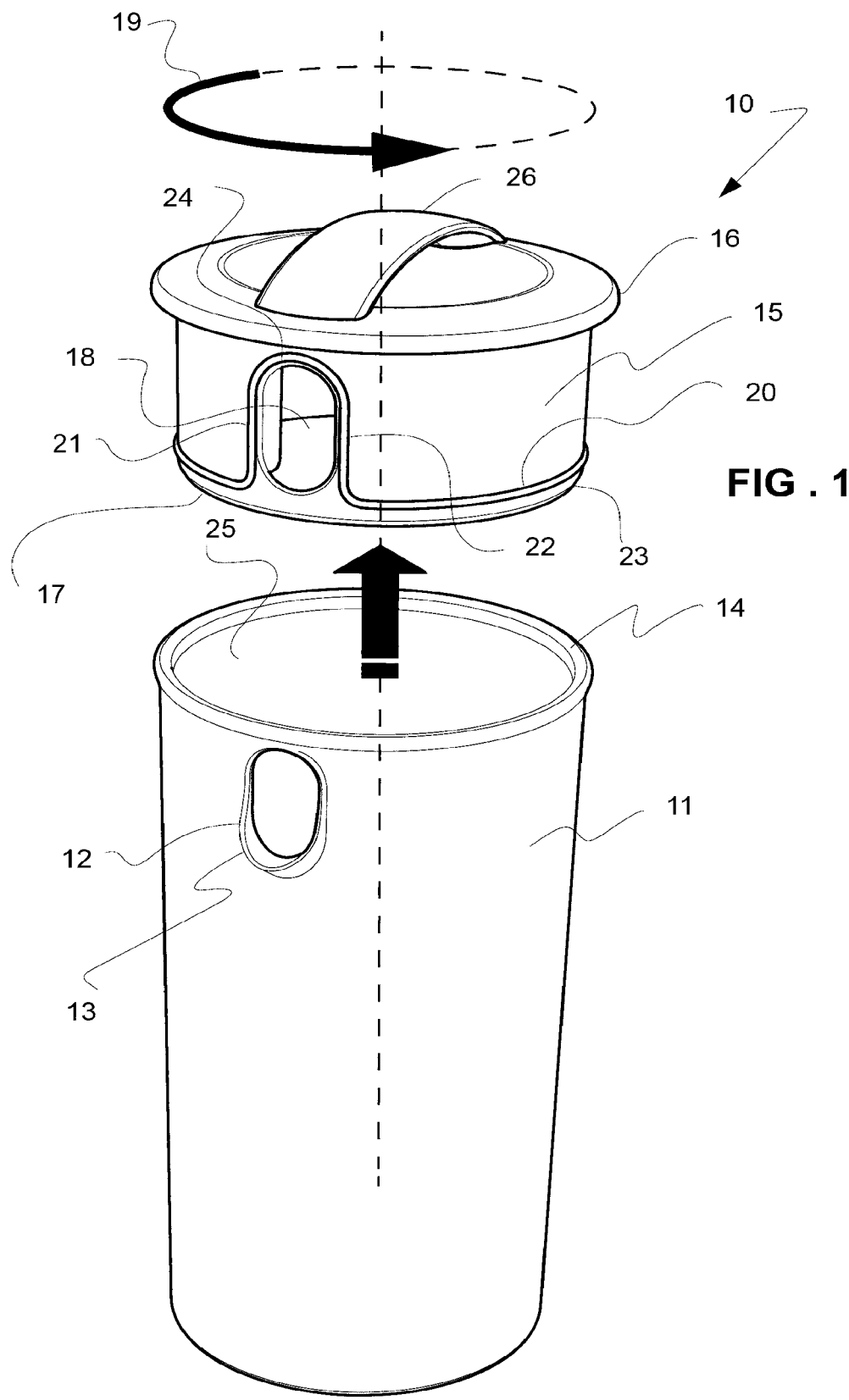

(51) Int. Cl.
*A47J 47/01* (2006.01)
*A47J 47/08* (2006.01)
*A23N 1/02* (2006.01)

(52) U.S. Cl.
CPC ............... *A47J 47/08* (2013.01); *A23N 1/02* (2013.01); *A47G 2019/122* (2013.01)

(58) Field of Classification Search
USPC ..... 222/475.1, 572; 220/203.05, 203.06, 361
See application file for complete search history.

(56) References Cited

U.S. PATENT DOCUMENTS

| | | | |
|---|---|---|---|
| 5,653,881 A | 8/1997 | Bruss et al. | |
| 7,431,851 B2 * | 10/2008 | Chan | A47J 43/283 99/496 |
| 2003/0214140 A1 * | 11/2003 | Lynd | A47G 23/0241 215/396 |
| 2006/0043125 A1 * | 3/2006 | Pope | A47G 19/14 222/475.1 |
| 2014/0261019 A1 | 9/2014 | Conti et al. | |

FOREIGN PATENT DOCUMENTS

| | | |
|---|---|---|
| CN | 101879036 A | 11/2010 |
| CN | 203749141 U | 8/2014 |
| JP | H1149213 A | 2/1999 |
| WO | WO-2005/002404 A1 | 1/2005 |
| WO | WO-2009010897 A2 | 1/2009 |
| WO | WO-2010128274 A1 | 11/2010 |
| WO | WO-2013/020179 A1 | 2/2013 |

OTHER PUBLICATIONS

Partial European Search Report issued in European Patent Application No. 15796261.4, dated Mar. 23, 2018.
Extended European Search Report issued in European Patent Application No. 15796261.4, dated Jul. 10, 2018.
International Search Report and Written Opinion for PCT/AU2015/000305, dated Nov. 4, 2015.
International Preliminary Report on Patentability for PCT/AU2015/000305, dated Nov. 22, 2016.

* cited by examiner

JUICER JUG

FIELD OF THE INVENTION

The invention relates to jugs and more particularly a sealable jug that cooperates with the discharge spout of a juicing machine.

BACKGROUND OF THE INVENTION

Fruit and vegetable juicers are well known. A fruit and vegetable juicer will typically have a discharge nozzle or the like through which fruit or vegetable juices are discharged. Some juicers are provided with a cooperating collection jug. The jug typically has a fill opening that receives the juicer's spout and a separate opening or spout associated with a pouring lip. Air coming from the juicer's discharge spout blows across the top of the juice contained within the jug and may have a tendency to blow juice foam, spray or mist into the vicinity of the jug's dispensing spout and thereby expel juice foam, spray or mist from the jug as it is being filled.

It is also known that fruit and vegetable juice will stay fresher when its exposure to air is limited. Juice which is deprived of oxygen slows the degradation of the juice through oxidation. Accordingly, juice may be stored for longer and without significant changes to colour and taste in a sealed container. Conventional jugs are not sealed particularly those used in conjunction with a fruit and vegetable juicer.

OBJECTS AND SUMMARY OF THE INVENTION

It is an object of the technology to provide a jug that cooperates with a fruit and vegetable juicer. A single opening in the side wall of the jug provides an inlet for the juicer's nozzle and also provides a pouring opening for the jug.

It is another object of the technology to provide a jug for a fruit and vegetable juicer that limits the expulsion of juice foam and spray from the jug.

It is another object of the technology to provide a jug for a fruit and vegetable juicer that may be sealed with respect to the atmosphere once removed from engagement with the fruit and vegetable juicer.

It is a further object of the technology to provide a combination of jug and lid that provides one lid orientation for both filling and pouring and a second orientation that isolates the interior of the jug from the external environment.

It is also an object of the technology to provide a flow guide that can be used with the nozzle of a juicer. The flow guide has features that provide internal turbulence and thus slow the flow of juice through the guide.

In another aspect of the technology, a nozzle for a juicer is provided with a slot on its underside to minimise pooling and consequent dripping.

In another embodiment, it is an object of the technology to provide a juicer having a juice collection chamber, the upper extent of which comprises an inwardly directed rim and an optional descending rim to prevent unwanted waste from being ejected.

BRIEF DESCRIPTION OF THE DRAWING FIGURES

Figure 2:
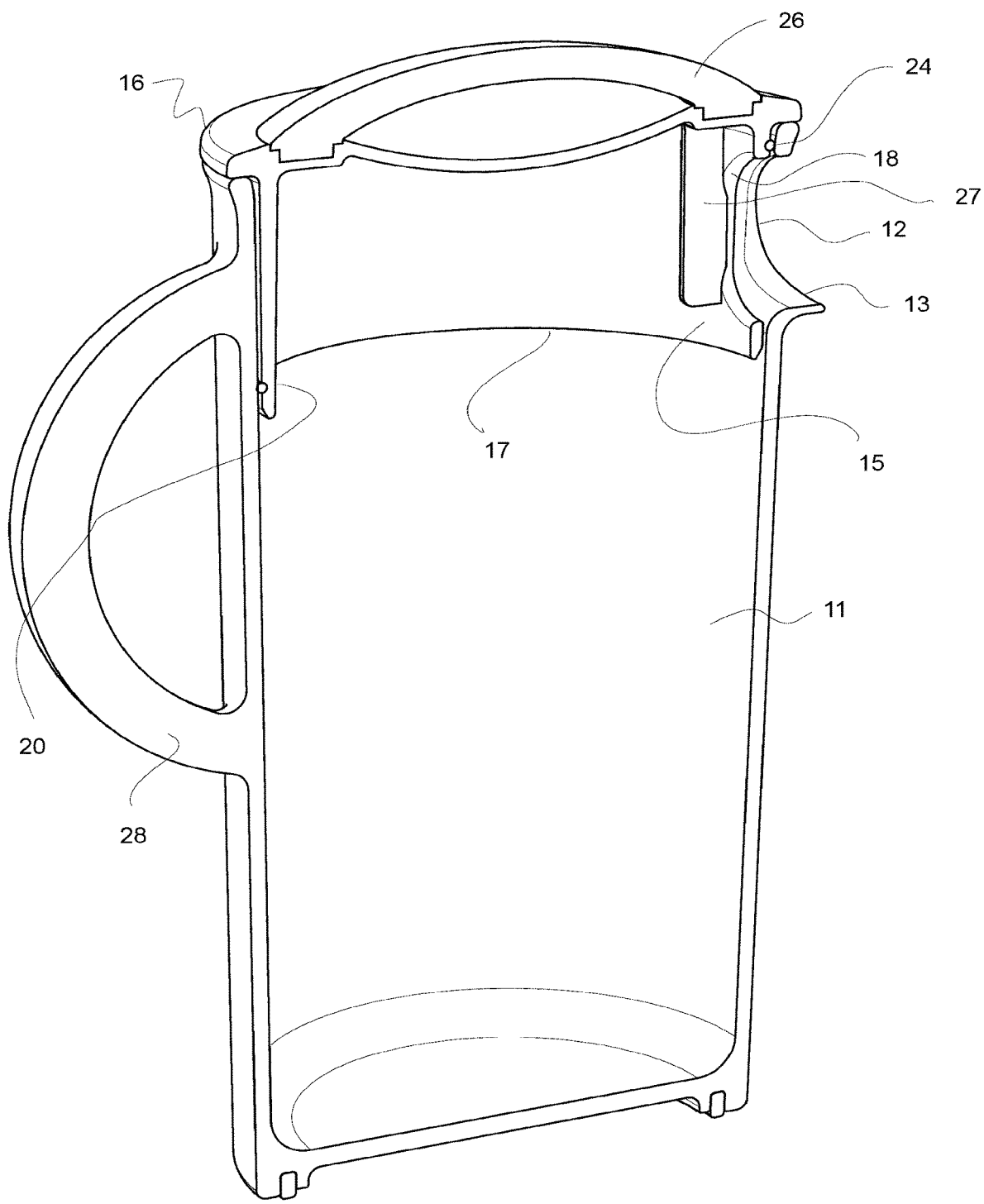
Figure 3:
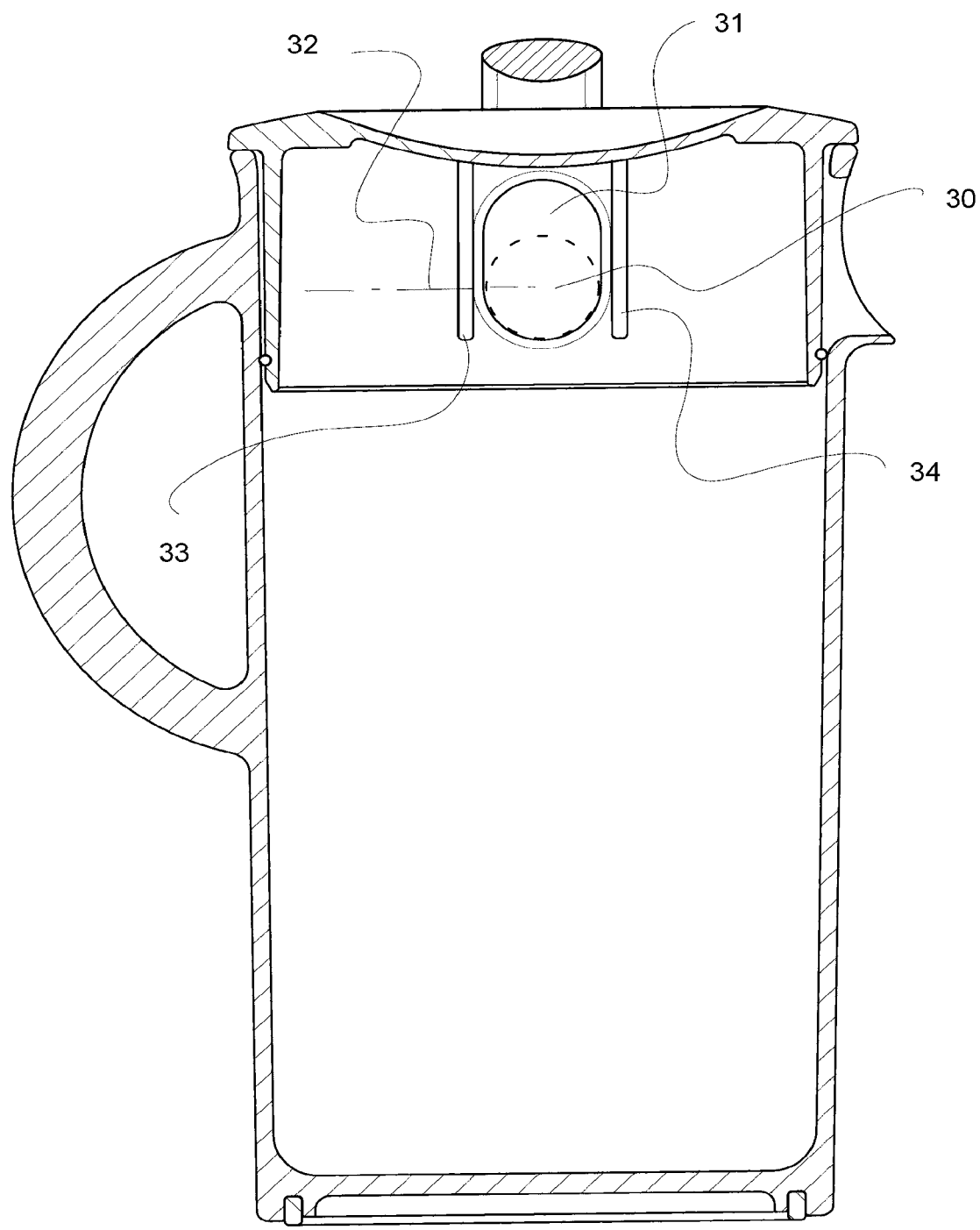
Figure 4:
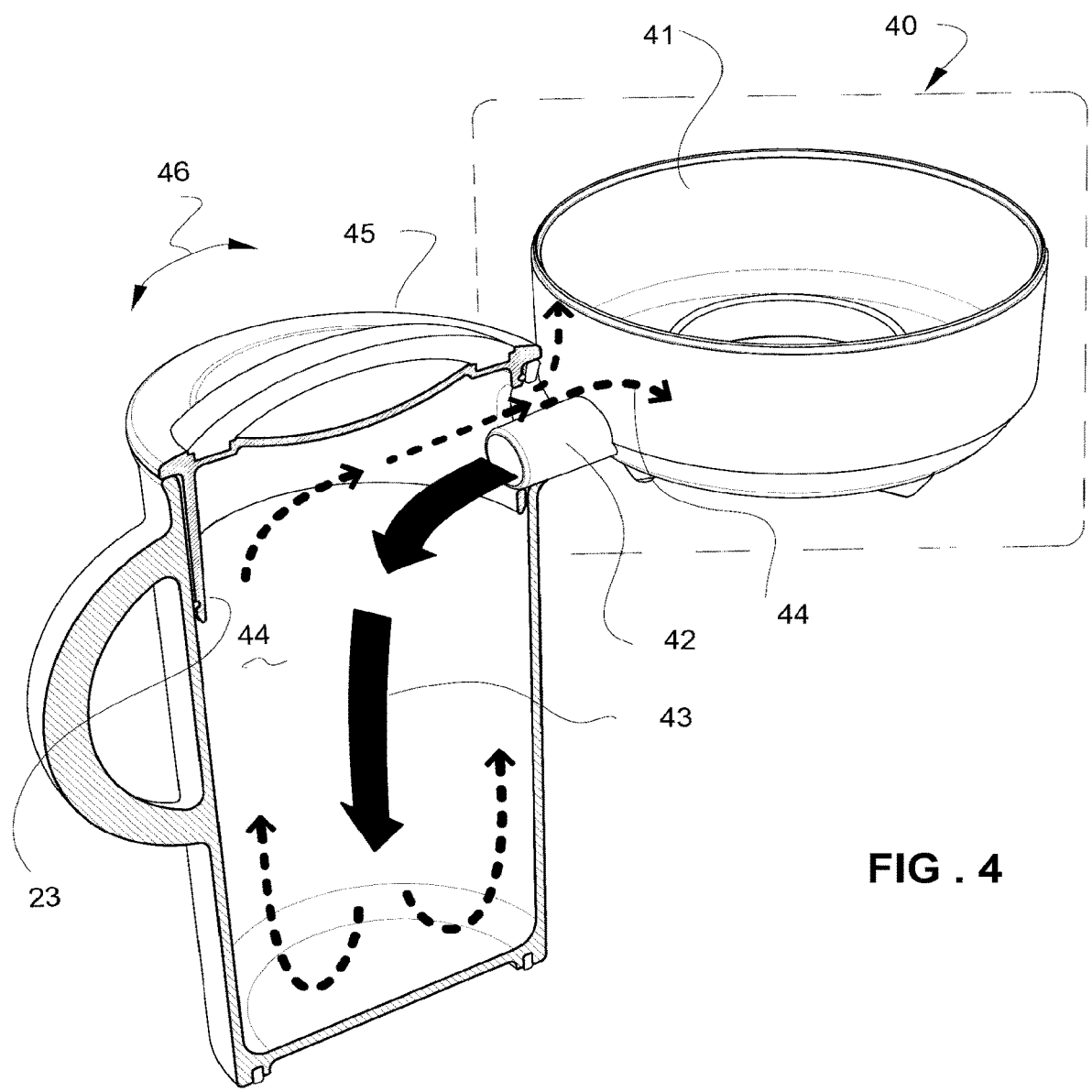
Figure 5:
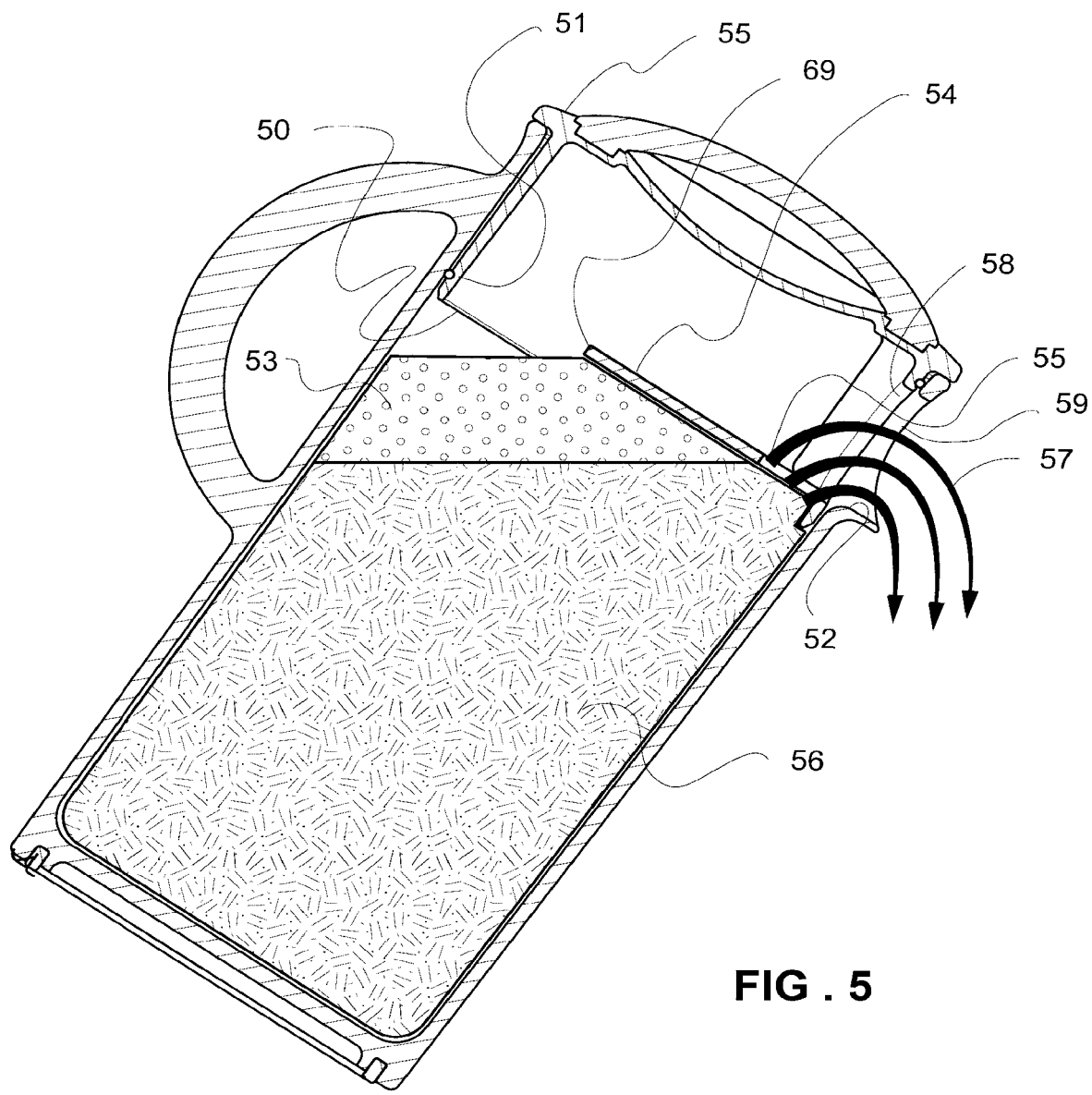
Figure 6:
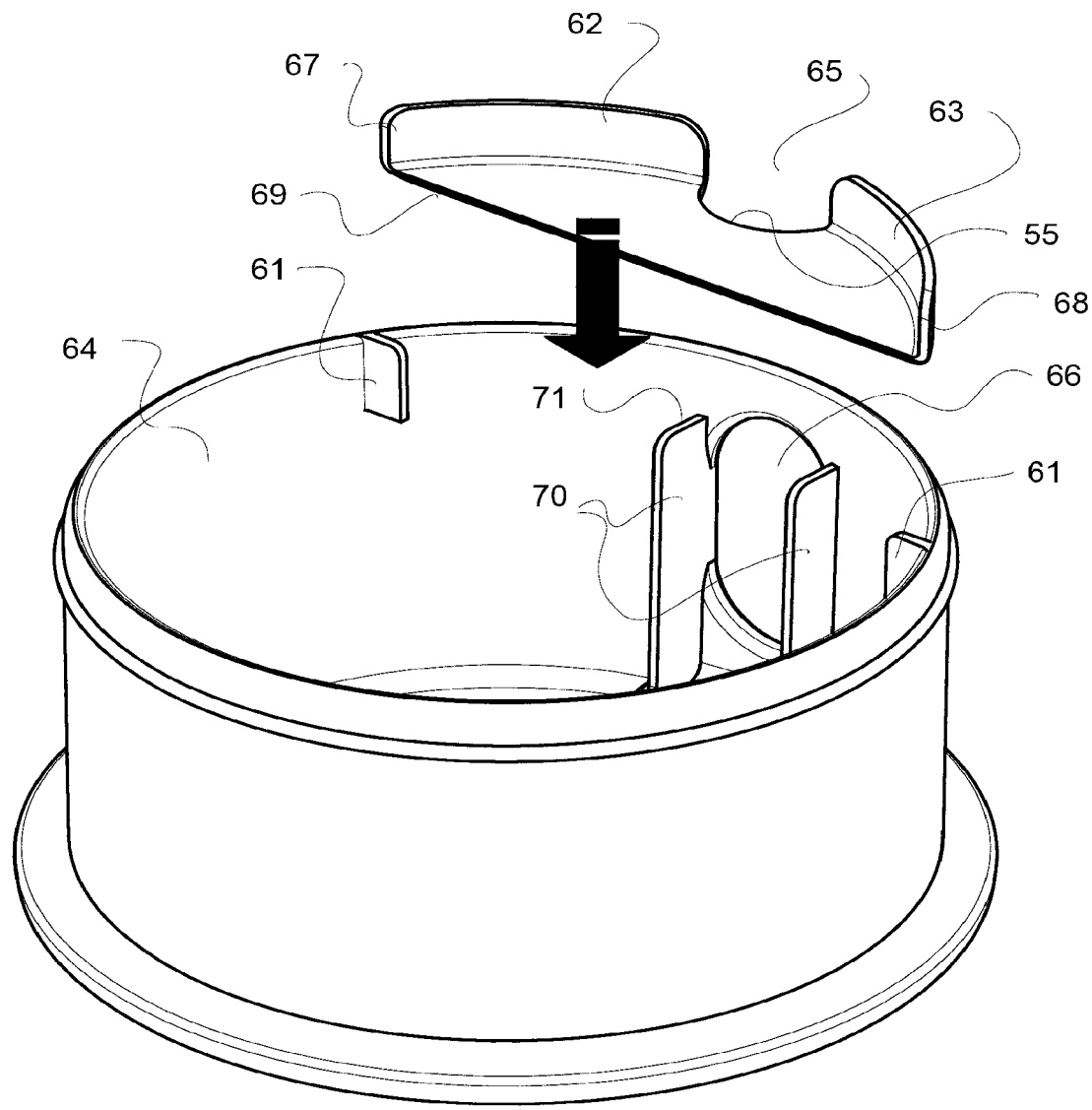
Figure 7:
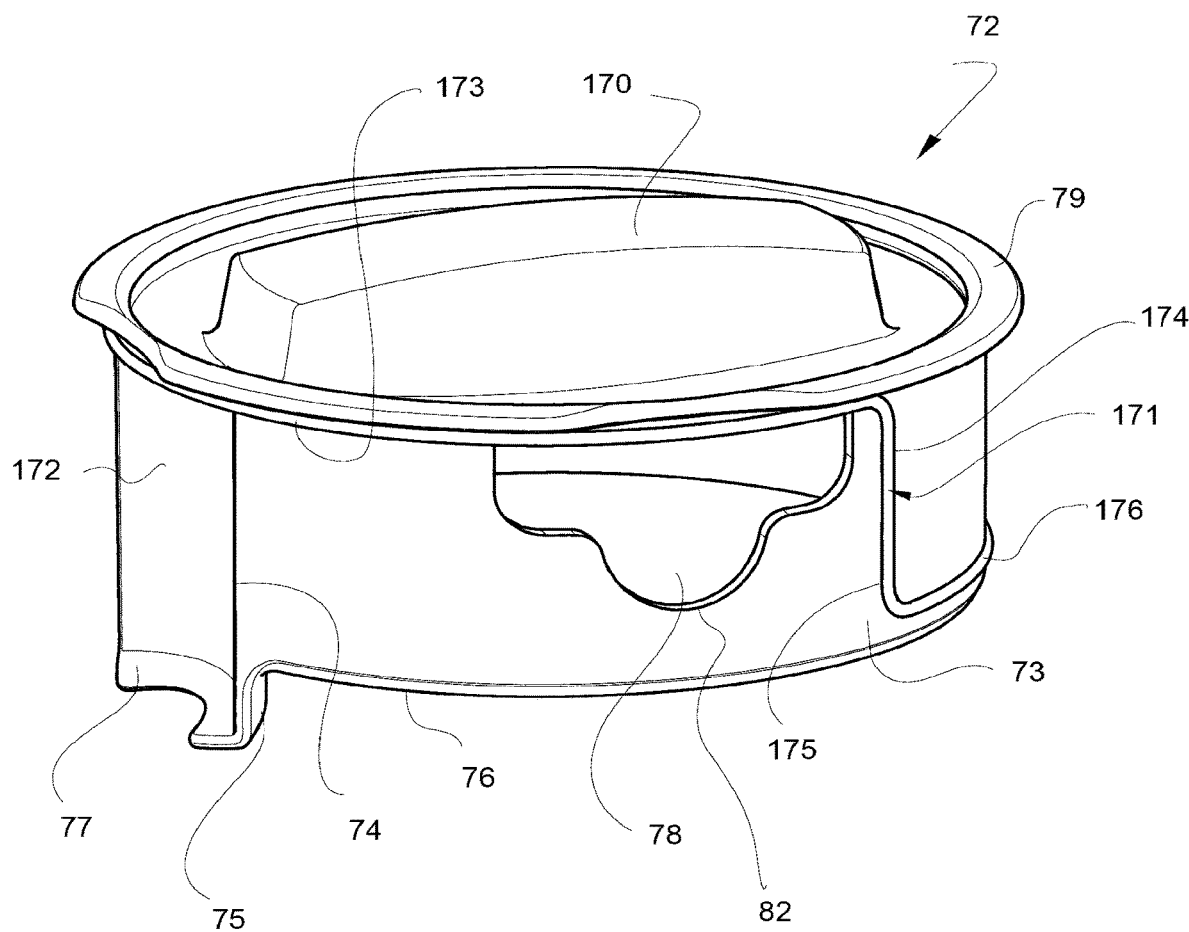
Figure 8:
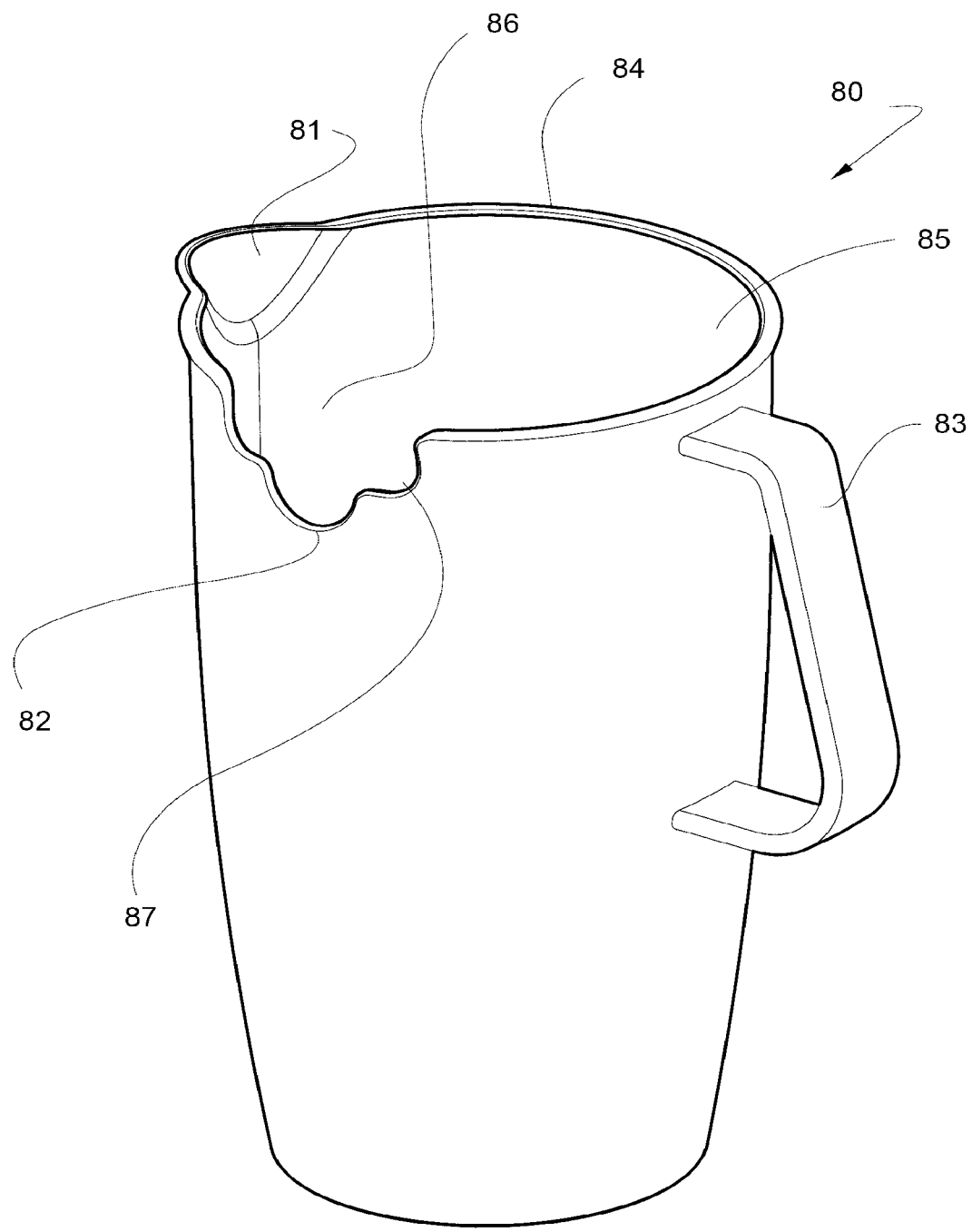
Figure 9:
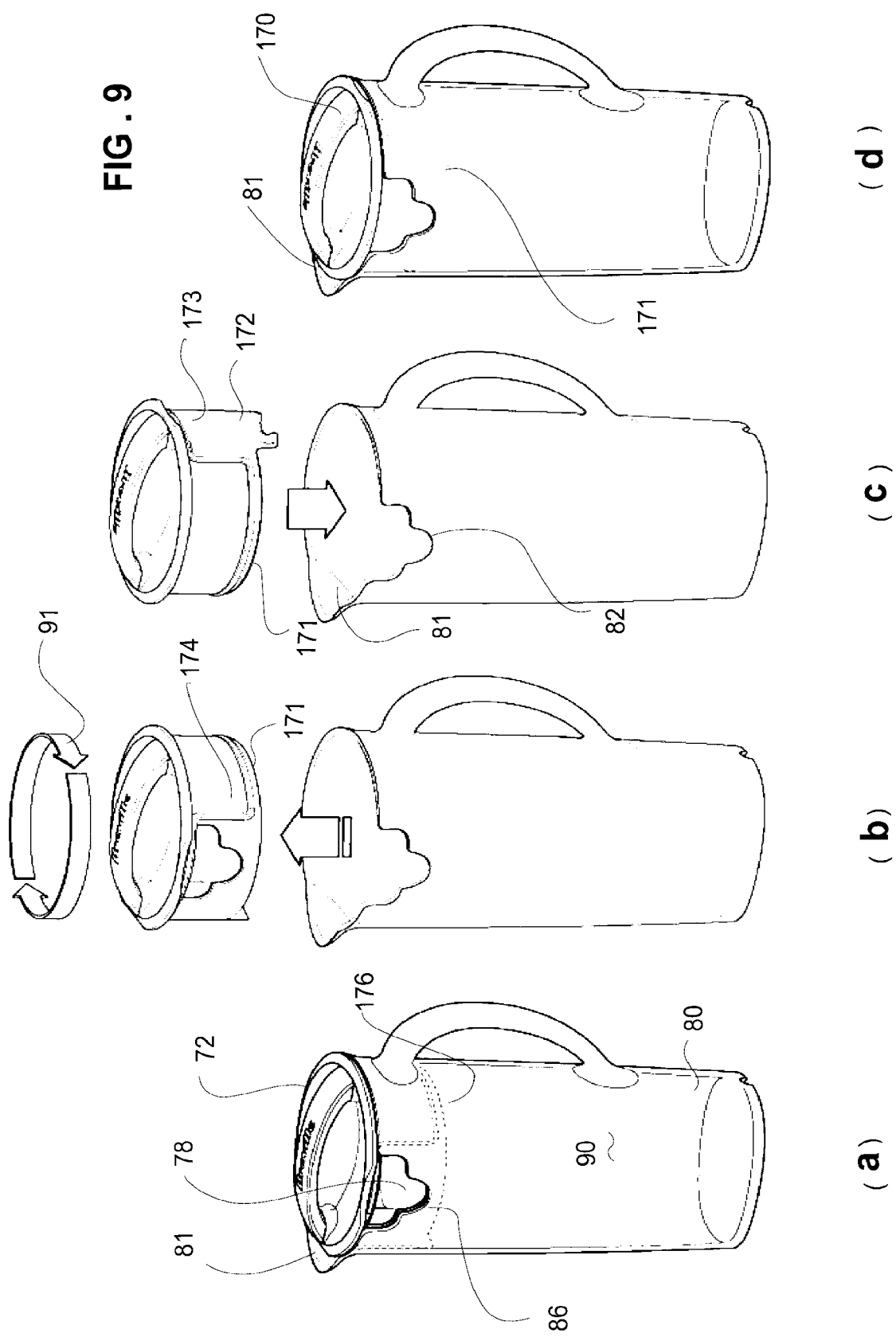
Figure 10:
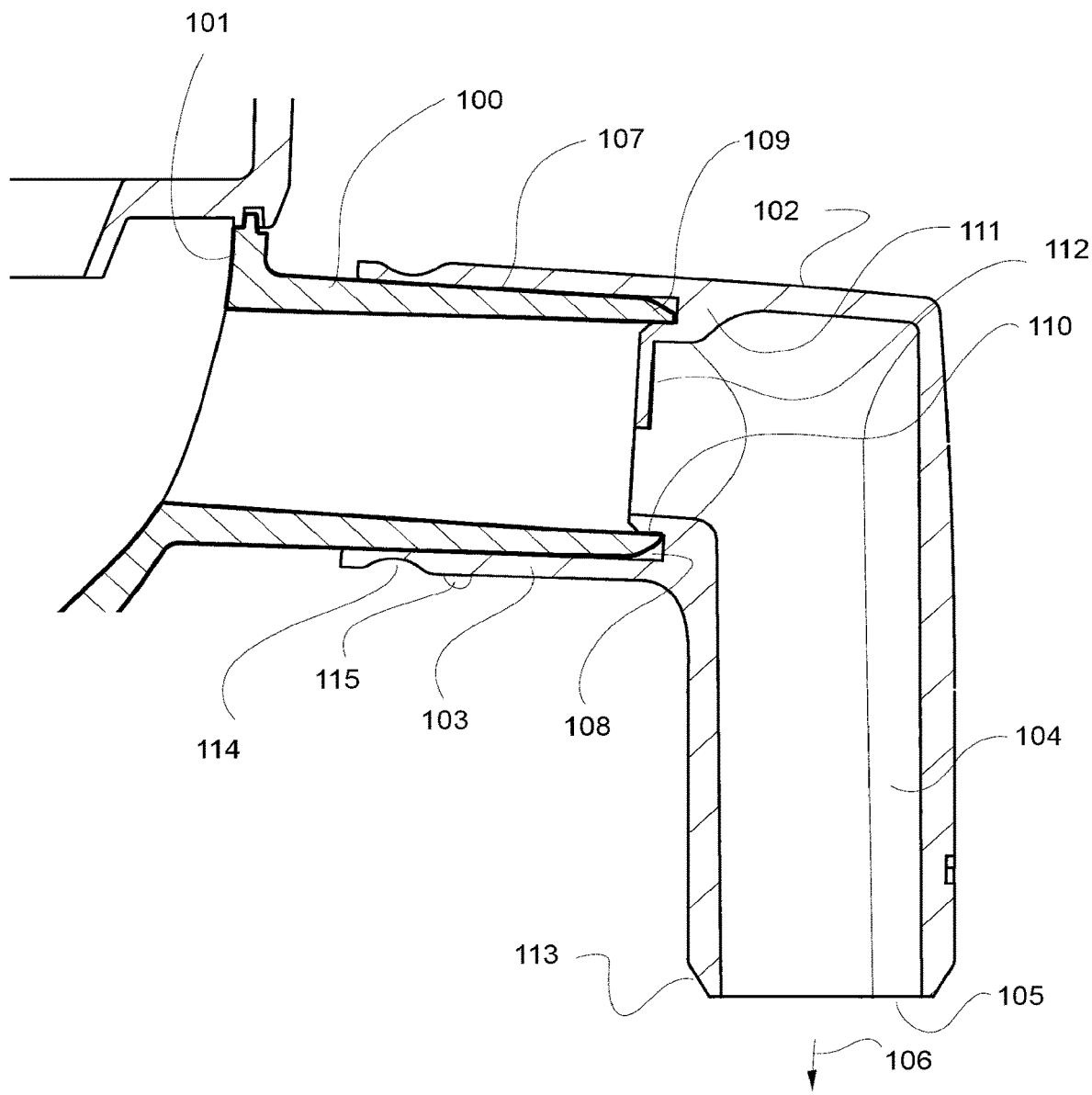
Figure 11:
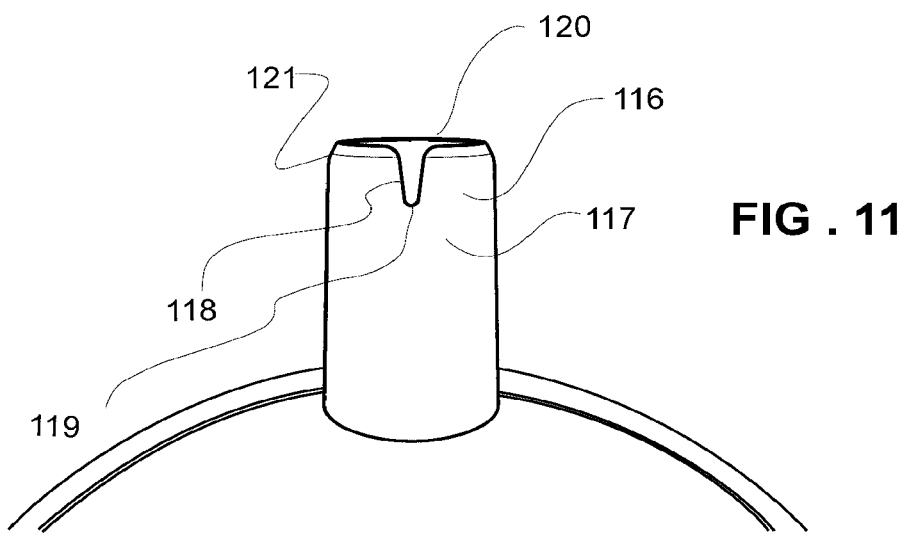
Figure 12:
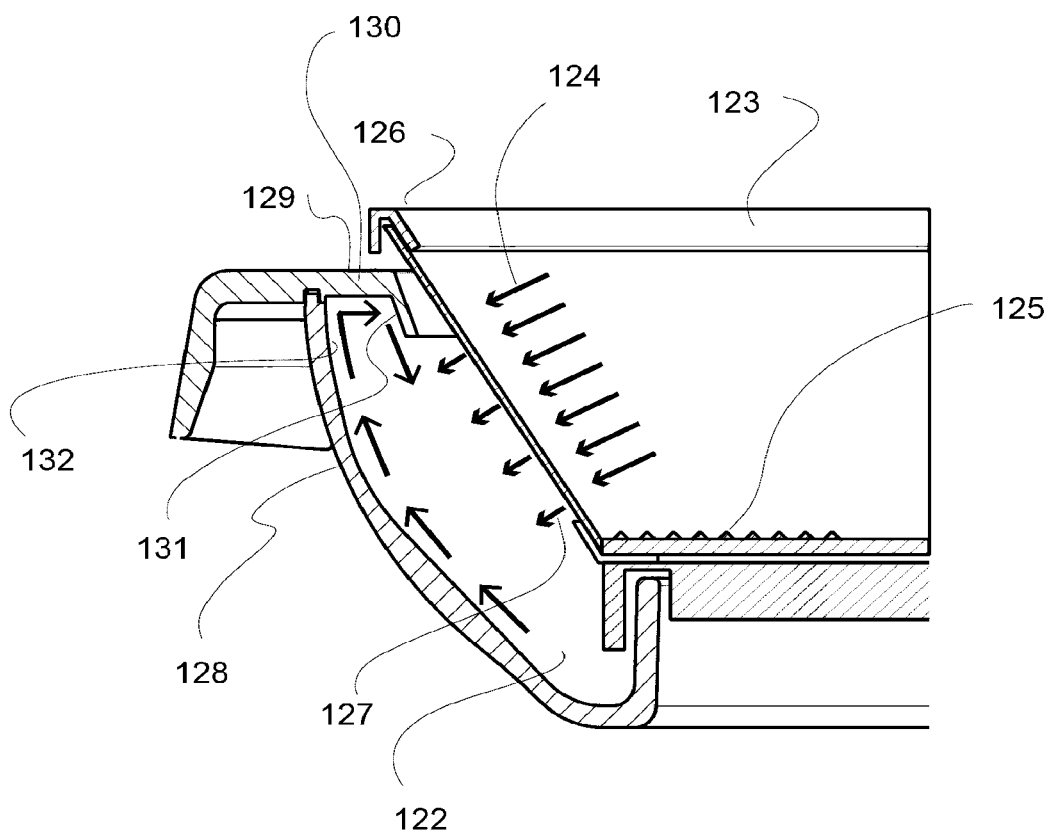

In order that the invention be better understood, reference is now made to the following drawing figures in which:

FIG. 1 is an exploded perspective of a jug and its lid;
FIG. 2 is a cross-section of the jug and lid of FIG. 1;
FIG. 3 is another cross-section of the jug and lid of FIG. 1;
FIG. 4 is another cross-section of the jug and lid of FIG. 1 shown with a juicer having a discharge nozzle.
FIG. 5 is a cross-section of a jug and lid illustrating a baffle for foam incorporated into the lid.
FIG. 6 is an exploded perspective view of the lid and baffle depicted in FIG. 5.
FIG. 7 is a perspective view of a lid.
FIG. 8 is a perspective view of a jug adapted to cooperate with a lid shown in FIG. 7.
FIGS. 9 (a), (b), (c) and (d) are perspective views of a jug and lid in both the filling and fully sealed orientation.
FIG. 10 is a cross-sectional view of a juicer nozzle and elastomeric flow guide.
FIG. 11 is an underside plan view of a juicer nozzle.
FIG. 12 is a cross-sectional view of a juice collection chamber and frusto-conical sieve.

BEST MODE AND OTHER EMBODIMENTS OF THE INVENTION

As shown in FIG. 1, a jug 10 for a fruit and vegetable juicer comprises a reservoir 11 in which a single opening in a side wall is formed 12. In this example the opening 12 has a pouring lip or spout 13. The reservoir 11 has an upper mouth or opening 14 that receives a rotating lid 15. The lid 15 has an upper flange 16 that limits the downward travel of the lid into the opening 14. When the flange 16 is fully inserted, the lowest rim of the lid's sidewall 17 is below the lowest point of the reservoir's opening 12. The lid's sidewall 15 has a nozzle receiving opening 18 that can be aligned in registry with the reservoir's opening 12 by inserting the lid and rotating it 19 appropriately. An exterior surface of the lid's side wall 15 carries or accommodates a polymeric seal 20. The seal 20 encircles the side wall 15 near the lower rim 17 and below the opening 18 except for in the area below the lid's opening 18. In the area below the opening 18, the seal 20 rises above the uppermost part of the opening 18. In this example, the seal 20 has two vertical legs 21, 22 that are continuous with both the rim surrounding portion 23 of the seal 20 as well as a curved portion 24 that passes above the opening 18 and below the projecting flange 16. When inserted into the reservoir 11, the seal 20 makes contact with an interior surface 25 of the jug and seals against it. The lid may have a transverse handle 26, for example on an upper surface, to facilitate handling and rotation of the lid.

As shown in FIG. 2, the lid may be inserted into the reservoir 11 so that the lid's opening 18 and the reservoir's opening 12 are in alignment or registry. The jug may have a handle 28. FIG. 2 also illustrates one of a pair of vertical baffles 27 that flank the lid's opening 18 from the interior. The baffles 27 prevent excessive discharge of spray, mist and foam from the interior of the jug. Other baffle arrangements are well known and the one illustrated is merely an example.

As shown in FIG. 3, the juicer's nozzle 30 is adapted to pass through the reservoir's opening 12 and the lid's opening 18. Both the reservoir's opening 12 and the lid's opening 18 are larger in the cross sectional than the cross sectional area of the nozzle 30, preferably by at least 25 percent. In this example, the juicer's nozzle 30 is round whereas the openings of the reservoir and lid are oval shaped with at least one portion preferably conforming to the shape of the juicer's nozzle. This creates a vent opening 31 that is above the transverse midline 32 of the juicer's nozzle 30 when it is inserted into the jug. The vent opening portion 31 allows air from within the jug 10 be expelled to the atmosphere. Also shown by way of example are the parallel or lateral baffles 33, 34 that are fixed to the interior side wall and interior of the top surface of the lid.

As shown in FIG. 4, a juicing machine 40 having a juice collection chamber 41 discharges juice through a nozzle 42. In this example, the nozzle is cylindrical, having a radius, shape configuration intended to cooperate with the radius of the lower parts of the openings 12, 18. The nozzle 42 protrudes through both openings 18, 12 and discharges juice 43 into the interior 44 of the reservoir. As the reservoir fills and air rises and circulates within the reservoir, such air is able to escape the reservoir 44 through the space 31 above the nozzle 42 created by the lid and reservoir openings 18, 12. However, when the nozzle is withdrawn and the reservoir's lid 45 is rotated in either direction 46 the circumferential seal 23 will isolate the contents of the reservoir from the atmosphere.

As shown in FIG. 5, it can be seen that the lower rim and much of the lid's seal 51 are located below the jug's pouring spout 52. In order to locate a baffle for inhibiting the flow of juice foam 53 from the spout, it is therefore advantageous to locate the juice baffle 54 within the lid 55. In this example, the baffle is generally parallel with the lower rim 50, extending partially across the interior of the lid and having an opening or recess 55 that allows juice 56 to be dispensed 57 through the lid opening 58 and jug opening 59.

As shown in FIG. 6, the lid has retaining features such as ears or tabs 61 for removably retaining a foam baffle 62. In this example, the baffle comprises a sidewall 63 that conforms to the interior surface 64 of the lid. The acuate side wall 63 is interrupted by a gap 65 that is aligned with or registers with the lid's opening 66 when the baffle is installed. The opening, notch or recess 55 extends away from the gap 65 to facilitate the pouring of juice 56 without excessive amounts of foam. The ends 67, 68 of the baffle's sidewall 63 are in this example interconnected by the baffle's interior edge 69, this edge forming a weir for aerated or foamed juice, as seen in FIG. 5. The gap and recess 65, fit below the lower edges 71 of the lateral baffles 70 so as to not interfere with it. It will be appreciated that the foam baffle 62 may be installed into the lid in any number of ways and that the shape of the baffle is not limited to the particular example depicted in FIG. 6.

As shown in FIG. 7, a rotating cap or lid 72 is particularly well adapted to cooperate with the jug 80 shown in FIG. 8. The lid 72 has a generally cylindrical body portion 73 that fits for snug rotation within a jug. The body portion 73 features an indentation, opening or scallop 74 that cooperates with the jug's spout 81. That portion of the lid's sidewall in which the scallop or opening 74 is found may have portion 75 that extends below the lower rim 76 of the lid 72 the extending portion 75 has an outwardly directed, arcuate shelf 77 that acts as a pouring baffle. The body portion 73 also features a through opening 78 so that the spout of a juicer can penetrate both the jug and the lid, as will be explained. An optional circumferential rim 79 is formed around the upper extent of the body portion 73 and overhangs the body portion 73. An elongated handle 170 or other features provided on an upper surface of the lid so that the lid may be easily rotated once inserted into the jug 80.

As suggested by FIGS. 7 and 9, an exterior surface of the sidewall of the lid features a continuous seal or bead 171. The seal 171 bears against the internal diameter of the jug 80 and isolates the contents within the interior from the atmosphere external to the jug. The seal 171 may be integral to the body portion. The arcuate vertical pouring channel 172 and the through opening 78 lie below one portion 173 of the continuous seal 172. This first partially circumferential portion the seal 173 has, at each end, a vertical seal portion 174. The lower end 175 of both vertical portions 174 are interconnected by a second circumferential portion 176 that is effectively stepped down from the first portion 173. The height of the step is defined by the length of the vertical portion 174. The second portion 176 lies (when installed in a jug) below both the jug's spout 81 and the lowest part of the spout receiving area 82 as shown in FIG. 8. In preferred embodiments, the stepped down circumferential portion of the seal 176 is diametrically opposite from the pouring channel 172.

As shown in FIG. 8, a jug particularly adapted to cooperate with a lid shown in FIG. 7 comprises a vessel having a spout 81 and opposite the spout, an optional handle 83. The vessel has an upper mouth opening 84 that receives the lid 72. The interior sidewall 85 is configured to sealingly cooperate with the lid 72 and its seal 171. In this example, the upper rim 84 descends vertically so as to define a gap 86. The gap has an arcuate lower portion 82 that is configured to lie closely adjacent with or in contact with the underside of a discharge spout of a juicer, particularly a juicer having an elevated nozzle. The term "elevated nozzle" refers to the nozzle of a centrifugal juicer in which centrifugal force imparted by the filter and rotating air flow within the juicing compartment is used to propel juice upward and above the floor of the juicing compartment to a nozzle that would not otherwise work if only gravity were able to propel juice out the juicing compartment. The arcuate portion 82 is flanked on either or both sides by portions 87 that are wider than the arcuate portion 82.

As shown in FIG. 9 (*a*), the combination of jug 80 and lid 72 have a filling orientation when assembled so that the lid opening 78 is in working registry with the jug's gap 86. Because these features are in registry and because the shape of the lid opening 78 conforms to the shape of the gap 86, a juicer discharge spout may be inserted through the lid opening 78 into the interior of the jug 90. In preferred embodiments, an underside or undersurface of the spout makes preferably closer intimate contact with the arcuate area 82 as previously described. In this orientation, the first portion 173 of the seal passes above the spout but does not make contact with the interior sidewall of the vessel because of the presence of the outwardly bulging spout 81. Considering FIG. 9 in conjunction with FIG. 10, it will be appreciated that the juicer's generally cylindrical discharge spout 100 only occupies a portion of the total cross sectional area of the opening formed by the overlapping gap 86 and lid opening 78. The cross-sectional area of the gap and opening 86, 78 provide a passageway through which air can be expelled from the vessel, even as the jug is being filled from the spout. The rotating frusto-conical sieve in a centrifugal juicer generates a substantial airflow that accompanies the juice exiting the spout. In the filling orientation, excess pressure within the interior of the vessel is relieved both through the open spout 81 and the gap and opening 86, 78 when thus in registry. The juicer's discharge spout only occupies a portion of the opening 78. In this example, the filling orientation depicted in FIG. 9 (*a*) is also a pouring orientation. As previously mentioned, the lid's seal does not interfere with the operation of the pouring spout 81 in this orientation and thus the jug and lid can be withdrawn from the juicer's discharge spout and used to pour out the contents of the jug without further rotation of the lid.

As suggested by FIG. 9 (*b*) the lid may be rotated 91 (even when within the jug) to arrive at the fully sealed orientation shown in FIGS. 9 (c) and 9 (d). In the fully sealed orientation, the lid's seal 171 passes below both the spout 81 and the lowest part of the arcuate portion 82. The first seal portion 173, being an arc of a circle, makes contact within the interior sidewall of the jug and thus isolates the pouring channel of the lid from the atmosphere external to the jug. In the fully sealed orientation, air is effectively prevented from entering the jug's interior. By isolating the interior from the atmosphere, the usable or shelf life of the fresh juice in the jug is lengthened.

As shown in FIG. 10, a juicer has a spout 100, in some examples, located at an upper extent of a juicing chamber 101. To minimise splashing associated with discharging juice into an open topped vessel like a cup or glass, an elastomeric flow guide 102 is provided. In this example, the flow guide 102 is generally circular in cross-sectional area and comprises a nozzle or spout attachment portion 103 that conforms to a nozzle's shape and a discharge conduit 104 formed at an angle to the attachment portion 103 and generally directed so that its discharge opening 105 discharges downwardly and vertically 106 (at least internally). It need not discharge directly downwardly or exactly vertically. It is important for the flow guide 102 to maintain a sealing engagement with the nozzle in order to prevent unnecessary dripping. Thus, the attachment portion 103 seals along its length with an outside surface 107 of the nozzle 100. In addition, the attachment portion has within it an internal circumferential groove 108 that receives the preferably tapered tip 109 of the nozzle 100 and seals against the entirety of an internal circumferential band no adjacent to the tip 109. Thus the attachment portion comprises a thickened area 111 to accommodate the circumferential gap 108. A thin internal membrane, such as a semi-circular membrane 112 extends across the internal diameter of the flow guide, preferably in the area of the circumferential gap 108. The flow restricting membrane 112 occupies an upper portion of the internal flow path of the flow guide comprising an air-restrictor baffle creating a pressure differential then creates turbulence and slows down the flow of juice through the flow guide 102. The change in direction of the airflow as it passes between the attachment portion 103 and the discharge channel 104 contribute to the turbulence within the flow guide, promoting slower, more regular flow characteristics in the discharge. The discharge opening 105 is preferably surrounded by a chamfered edged 113 that reduces the amount of foam that can form and adhere to the lower extent of the flow guide. This prevents unnecessary dripping when the juice receiving vessel has been removed from beneath the discharge opening 105. The attachment portion 103 may feature circumferential indentations, other indentations, or protruding features 114, 115 to assist with manual attachment and removal of the flow guide from the spout 100.

As shown in FIG. 11, a juicer's discharge spout 116 is generally cylindrical although the thickness of its sidewalls may be tapered. The spout is usually arranged at a slight inclination downward to promote flow through it. The spout 116 has an undersurface 117. In preferred embodiments, the undersurface may be provided with an open ended slot 118. In this example, the slot has a rounded terminal end 119 and tapers slightly wider toward the spout's discharge opening 120. The slot or gap prevents juice from pooling at the bottom of the nozzle and mitigates unwanted dripping from the nozzle. The slot cooperates with the chamfered terminal edge 121 of the nozzle to reduce the front facing surface area and further mitigate dripping.

As shown in FIG. 12, a juicing chamber 122 of a centrifugal juicer contains a frusto-conical sieve and grating disc 123. The chamber 122 has a bowl-like sidewall that is larger in diameter at the top than at the bottom. As the sieve 123 rotates, juice and pulp 124 generated by the grating features 125 are forced against the interior of the sieve. Because of the angle of the sieve, pulp solids are ejected past the upper rim 126. Liquid juice 127 passes through the sieve and is driven upwards 128 by the centrifugal force and airflow within the juice collection chamber. The upward flow 128 is contained and redirected by a circumferential rim portion 129 of the juice collection chamber. In this example, the rim portion 129 comprise a first or horizontal or transverse circumferential portion 130 and a descending circumferential rim 131. The descending rim 131 is spaced away from the interior sidewall 132 of the juice collection portion and may be parallel to the sidewall of the frusto-conical sieve. The rim 131 descends into the interior of the juice collection chamber. In this way, juices redirected downward and away from the uppermost regions of the juice collection chamber. This increases the yield discharged from the nozzle by reducing the amount of juice that is inadvertently discharged from the juice collection chamber essentially as waste. In preferred embodiments, the horizontal portion 130 is located below the rim of the frusto-conical sieve 123 when it is installed in the juice collection chamber. In preferred embodiments, the juicing chamber has an upwardly outwardly curving sidewall. In preferred embodiments the descending rim is downwardly and inwardly extending (this results in less down force than a vertical sidewall and the descending rim is most effective/necessary in this arrangement). In preferred embodiments the descending rim extends substantially parallel to the sieve sidewall. The rim portion may be a removable attachment to the juicing chamber, or the rim portion may be fabricated and fixed, bonded or welded to the juice collection chamber.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

The invention claimed is:

1. A jug and lid assembly for juicer, comprising:
   a jug having an upper portion, with the upper portion including a first opening for receiving a discharge spout of a juicer; and
   a lid having a generally cylindrical body portion that is adapted to fit within the upper portion,
   wherein the cylindrical body portion includes:
      a second opening that is adapted to be aligned with the first opening of the upper portion of the jug;
      a vertical pouring channel; and
      a stepped circumferential seal that isolates the first opening from an atmosphere external to the jug in a sealing orientation, and, upon rotation of the lid into a filling orientation, aligns the first and second openings,
   wherein the first and second openings each have an arcuate portion for receiving the discharge spout of the juicer, and
   wherein the arcuate portion is flanked by one or more relief portions.

2. The jug and lid assembly of claim 1, wherein the upper portion of the jug further includes a pouring spout, and, upon rotation of the lid into the filling orientation, the stepped circumferential seal opens the pouring spout so as to also provide a pouring orientation.

3. The jug and lid of claim 1, wherein:
   the one or more relief portions are wider than the arcuate portion.

4. The jug and lid of claim 1, wherein:
   the stepped circumferential seal is integrally moulded with the body portion of the lid.

5. The jug and lid of claim 1, wherein:
   the lid has a transverse handle.

6. The jug and lid of claim 1, wherein:
   the seal is continuous.

7. The jug and lid of claim 2, wherein:
   the pouring channel terminates in a shelf.

8. The jug and lid of claim 7, wherein:
   the shelf is generally parallel with a lower rim of the lid, the shelf having a recess that allows a juice to be dispensed from the first opening.

9. The jug and lid of claim 8, wherein:
   the body portion has an indentation, opening or scallop that cooperates with the pouring spout.

10. The jug and lid of claim 9, wherein:
    the indentation, opening or scallop includes a portion that extends below the lower rim of the lid, with the portion providing the shelf of the pouring channel.

11. The jug and lid of claim 1, wherein:
    the second opening is below a first, partially circumferential portion of the seal.

12. The jug and lid of claim 11, wherein:
    the first circumferential portion of the seal has, at each end, a vertical seal portion, and a lower end of the vertical seal portions are connected by a second circumferential portion that is stepped down from the first circumferential portion.

13. The jug and lid of claim 12, wherein:
    the second circumferential portion of the seal is located below both the first and second openings and the spout when the lid is installed.

14. The jug and lid of claim 13, wherein:
    the stepped circumferential portion is located diametrically opposite from the vertical pouring channel.

* * * * *